United States Patent
Lai

(10) Patent No.: US 9,004,734 B2
(45) Date of Patent: Apr. 14, 2015

(54) LIGHT GUIDE PLATE INCLUDING OPTICAL FIBERS AND METHOD OF MANUFACTURING SAME

(71) Applicant: Chih-Chen Lai, New Taipei (TW)

(72) Inventor: Chih-Chen Lai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 201 days.

(21) Appl. No.: 13/631,706

(22) Filed: Sep. 28, 2012

(65) Prior Publication Data

US 2013/0272030 A1    Oct. 17, 2013

(30) Foreign Application Priority Data

Apr. 12, 2012   (TW) .............................. 101112903 A

(51) Int. Cl.
| | |
|---|---|
| *F21V 7/04* | (2006.01) |
| *B32B 37/18* | (2006.01) |
| *G02B 6/10* | (2006.01) |
| *B32B 37/12* | (2006.01) |

(52) U.S. Cl.
CPC ....... *B32B 37/185* (2013.01); *B32B 2037/1253* (2013.01); *B32B 2307/412* (2013.01); *B32B 2310/0806* (2013.01); *G02B 6/10* (2013.01); *Y10T 156/1056* (2015.01)

(58) Field of Classification Search
CPC ...................................................... G02B 6/08
USPC ......................................... 362/554, 556, 617
See application file for complete search history.

(56) References Cited

U.S. PATENT DOCUMENTS

| | | | | |
|---|---|---|---|---|
| 5,042,892 | A | * | 8/1991 | Chiu et al. ..................... 385/114 |
| 2008/0101084 | A1 | * | 5/2008 | Hsu ............................... 362/612 |

* cited by examiner

*Primary Examiner* — Sean Gramling
(74) *Attorney, Agent, or Firm* — Novak Druce Connolly Bove + Quigg LLP

(57) ABSTRACT

A light guide plate includes a number of optical fibers positioned side by side and transparent curable glue adhering the optical fibers together. The optical fibers and the curable glue cooperatively form a light incident surface and a light output surface connected to the light incident surface. The light output surface defines light output holes.

5 Claims, 7 Drawing Sheets

LIGHT GUIDE PLATE INCLUDING OPTICAL FIBERS AND METHOD OF MANUFACTURING SAME

BACKGROUND

1. Technical Field

The present disclosure relates to a light guide plate and a method for manufacturing the light guide plate.

2. Description of Related Art

A light guide plate is used for expanding a point light source or a linear light source to a surface light source. Currently, light guide plates are manufactured by injection molding, which often results in plates with stress marks and deformities.

Therefore, a light guide plate and a method for manufacturing the light guide plate which can overcome the above-mentioned problems are needed.

DETAILED DESCRIPTION

Figure 1:
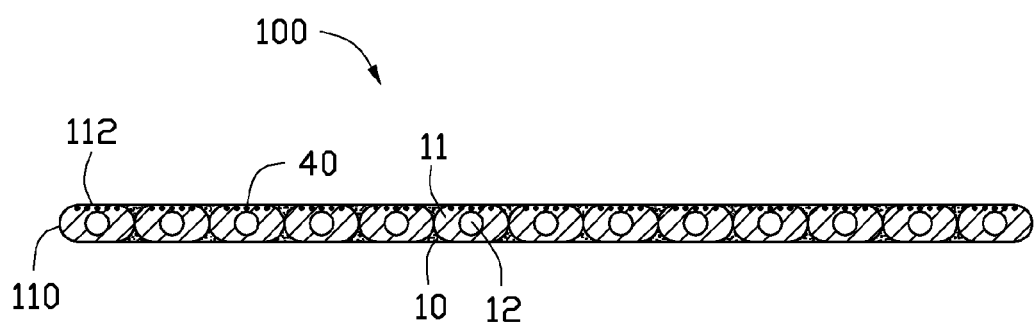
FIG. 1 is a schematic view of a light guide plate according to a first embodiment.
Figure 2:
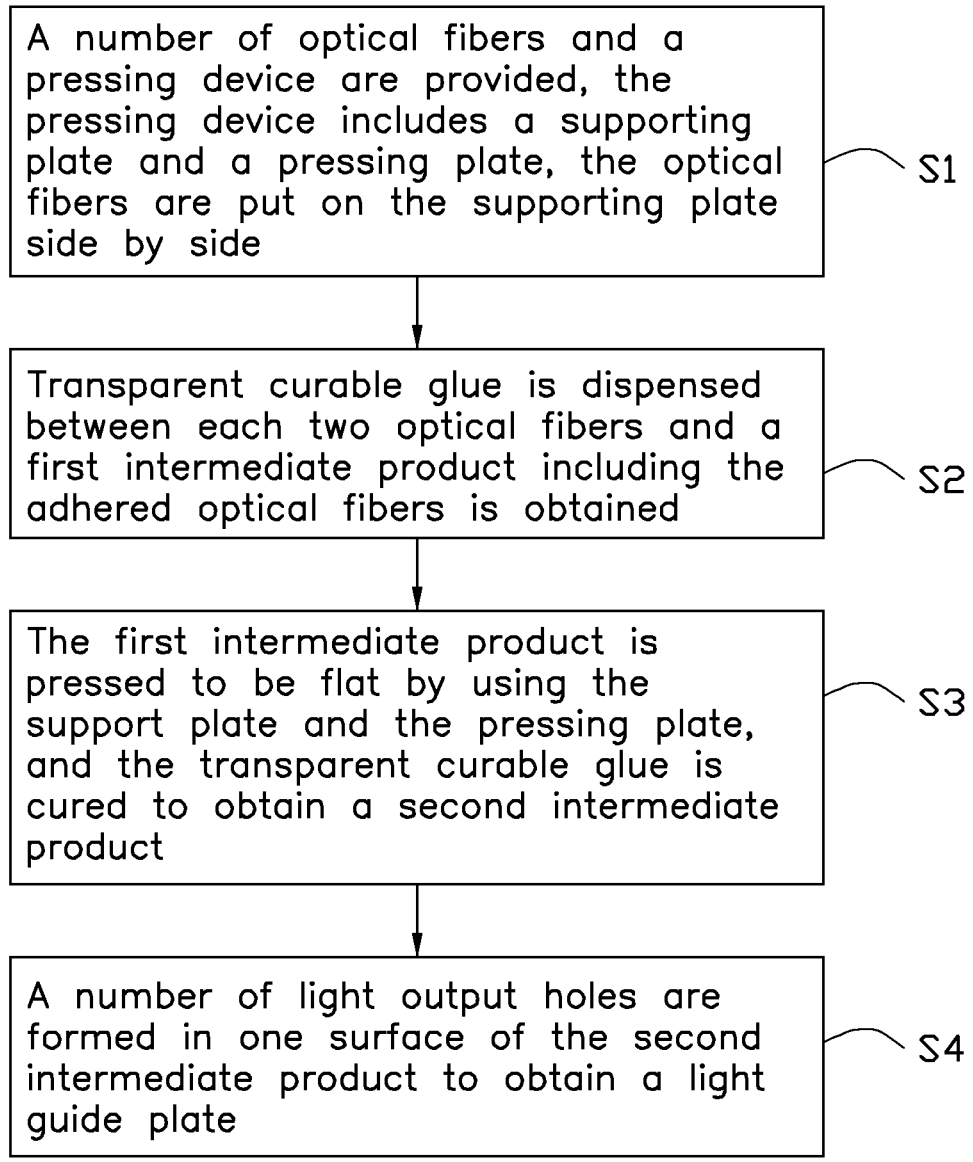
FIG. 2 is a flow chart of a method for manufacturing the light guide plate of FIG. 1 according to a second embodiment.
Figure 3:
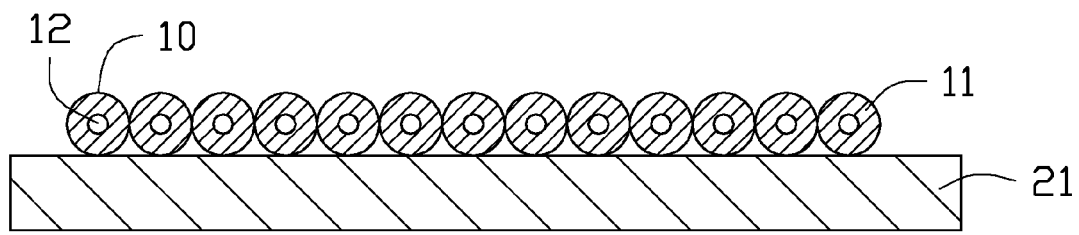
FIGS. 3-7 are schematic views showing the steps of the method of FIG. 2.
Figure 4:
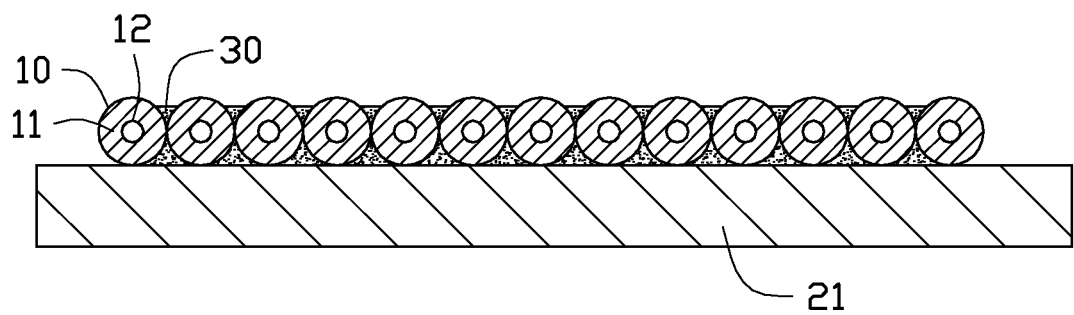
Figure 5:
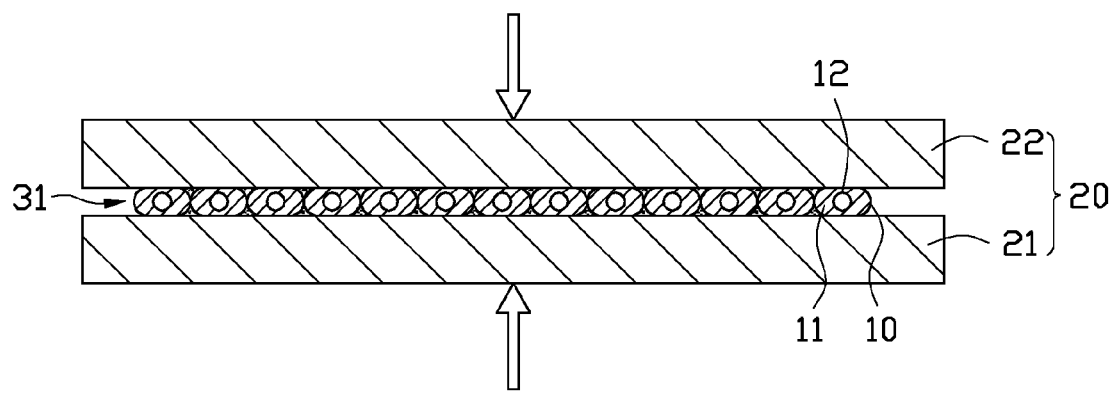
Figure 6:
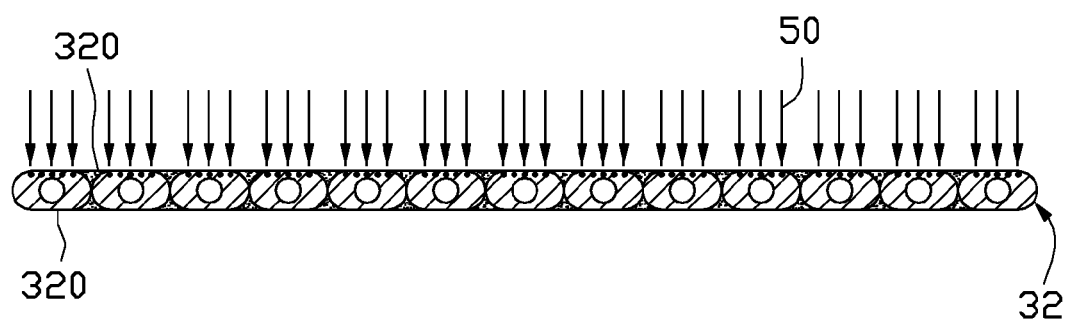
Figure 7:
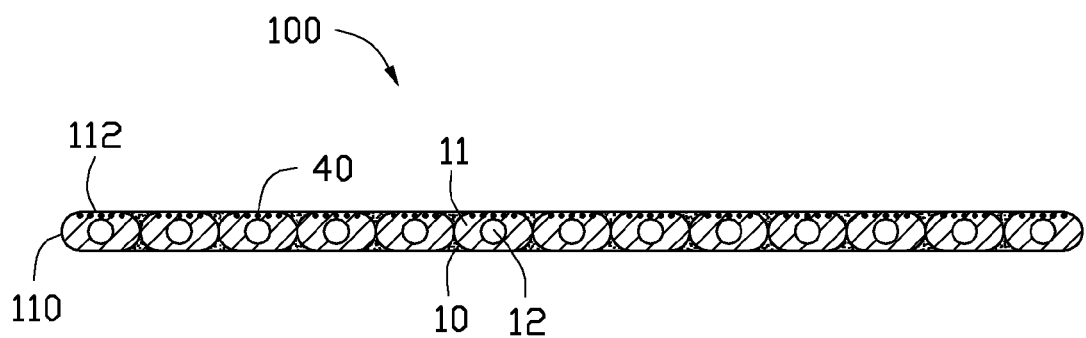

Referring to FIG. 1, a light guide plate 100 according to a first embodiment is shown. The light guide plate 100 includes a number of optical fibers 10. The optical fibers 10 are adhered to each other and are pressed to make the optical fibers 10 flat. Each of the optical fibers 10 includes a core 12 and a cladding layer 11 surrounding the core 12. The core 10 and the cladding layer 11 are made of plastic. The light guide plate 100 includes a light incident surface 110 and a light output surface 112 connected to the light incident surface 110. The light output surface 112 defines a number of light output holes 40. The light output holes 40 extend through the cladding layer 11 so that light transmitted but not totally internally reflected in the core 12 can be output from the light output holes 40. The light output holes 40 are made by a laser machining process.

Referring to FIGS. 2-7, a method for manufacturing the light guide plate 100, according to a second embodiment, is shown. The method includes steps described as follows.

In step S1, a number of optical fibers 10 and a pressing device 20 are provided. The pressing device 20 includes a supporting plate 21 and a pressing plate 22. The optical fibers 10 are put on the supporting plate 21 side by side.

In step S2, transparent curable glue 30 is dispensed between each two optical fibers 10 and a first intermediate product 31 including the adhered optical fibers 10 is obtained. The transparent curable glue 30 is a light curable resin or a heat curable resin.

In step S3, the first intermediate product 31 is pressed flat by using the support plate 21 and the pressing plate 22, and the transparent curable glue 30 is cured to obtain a second intermediate product 32. In this embodiment, the first intermediate product 31 is pressed to make the cladding layer 11 flat but the core 12 is still cylindrical. The transparent curable glue 30 is cured by light or heat. The second intermediate product 32 includes two opposite pressed surfaces 320.

In step S4, a number of light output holes 40 are formed in one of the pressed surfaces 320 to obtain a light guide plate 100. In this embodiment, the light output holes 40 are formed by laser beams 50. The light output holes 40 extend through the cladding layers 11 of the optical fibers 10 and the core 12 is exposed.

The light guide plate 100 is manufactured by pressing the optical fibers 10, in this way, the light guide plate 100 can be made flat without causing stress marks and deformations.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A method for manufacturing a light guide plate, comprising:
   providing a plurality of optical fibers and a pressing device, the pressing device comprising a supporting plate and a pressing plate;
   positioning the optical fibers on the supporting plate side by side;
   dispensing transparent curable glue between each two of the optical fibers to obtain a first intermediate product;
   pressing the first intermediate product to be flat by using the support plate and the pressing plate;
   curing the transparent curable glue to obtain a second intermediate product, the second intermediate product comprising two opposite pressed surface; and
   forming a plurality of light output holes in one of the pressed surfaces to obtain the light guide plate.

2. The method of claim 1, wherein in the step of forming a plurality of light output holes, the light output holes are formed by laser beams.

3. The method of claim 1, wherein each of the optical fibers comprises a core and a cladding layer surrounding the core, the light output holes extend through cladding layers of the optical fibers.

4. The method of claim 3, wherein the core and the cladding layer of each of the optical fibers are made of plastic.

5. The method of claim 1, wherein the transparent curable glue is one selected from the group consisting of light curable resin and heat curable resin.

* * * * *